United States Patent Office 3,304,298
Patented Feb. 14, 1967

3,304,298
PROCESS FOR PREPARING DL-RIBOSE AND
INTERMEDIATES THEREFOR
Issei Iwai, Tadahiro Iwashige, Motoji Asai, Kazuo Tomita,
Tetsuo Hiraoka, and Junya Ide, all of Tokyo, Japan,
assignors to Sankyo Company, Limited, Tokyo, Japan
No Drawing. Filed Oct. 9, 1964, Ser. No. 402,963
Claims priority, application Japan, Apr. 17, 1961,
36/13,082, 36/13,083; Oct. 2, 1961, 36/35,287
6 Claims. (Cl. 260—209)

This is a continuation-in-part application of our application Serial No. 187,199, filed April 13, 1962, and now abandoned.

This invention relates to a new process for preparing DL-ribose.

Heretofore, there are described in literature a number of processes for preparing D-ribose. However, in these processes, D-ribose is obtained by conversion of monosaccharides, for example, partial decomposition of hexose or by extraction from natural substances. These processes are commercially disadvantageous because of their limited supply and high cost. As a result of studies made in order to discover commercially useful processes for the preparation of DL-ribose, it has now been discovered that by the total synthetic process as described below in details DL-ribose may be prepared in very high yield. Furthermore, it has also been found that the reaction in the fourth step in the process according to the present invention, which involves conversion of 2-alkoxy-5-hydroxymethyl-2,5-dihydrofuran derivatives having the below described Formula V to 2-alkoxy-3,4-dihydroxy-5-hydroxymethyl-tetrahydrofuran derivatives having the below described Formula VI by introduction of hydroxy groups, proceeds stereospecifically without formation of DL-lyxose, and consequently gives only the desired DL-ribose in very high yield.

It is therefore an object of the invention to provide a process for preparing DL-ribose by total synthesis. Other objects will be apparent from the description hereinbelow.

According to the present invention, DL-ribose may be prepared by subjecting allylalcohol derivatives having the formula $$R-O-CH_2-CH=CH-R_1 \qquad (I)$$

wherein R is a member selected from the group consisting of 2-tetrahydropyranyl and 2-tetrahydrofuryl groups and $R_1$ is a member selected from the group consisting of hydrogen atom, a lower alkyl group containing from 1 to 3 carbon atoms

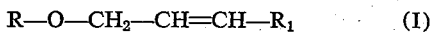

to ozone oxidation to form glycol aldehyde derivatives having the formula $$R-O-CH_2-CHO \qquad (II)$$

wherein R has the same meaning as above, reacting the latter compounds with propargyl acetal derivatives having the formula

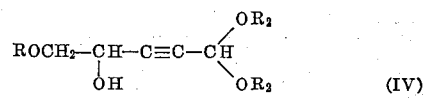

wherein M is a member selected from the group consisting of an alkali metal and MgX in which X is a member selected from the group consisting of chlorine, bromine and iodine atoms and $R_2$ is a lower alkyl group containing from 1 to 3 carbon atoms to form 1,1-dialkoxy-pent-2-yn-4,5-diol derivatives having the formula

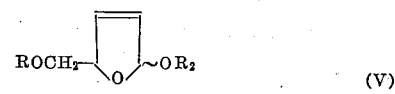

wherein R and $R_2$ have the same meaning as above, subjecting the latter compounds to partial hydrogenation in the presence of a rare metal catalyst to form 2-alkoxy-5-hydroxymethyl-2,5-dihydrofuran derivatives having the formula

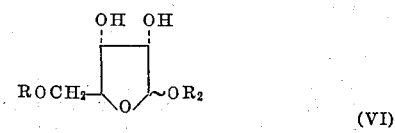

wherein R and $R_2$ have the same meaning as above, reacting the latter compounds with an oxidizing agent to form 2-alkoxy-3,4-dihydroxy-5-hydroxymethyl-tetrahydrofuran derivatives having the formula

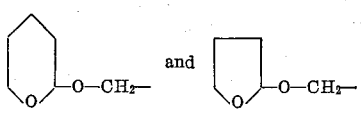

wherein R and $R_2$ have the same meaning as above and treating the latter compound with a diluted mineral acid to form DL-ribose. These reactions in the process according to the present invention may be chemically represented by the following equation:

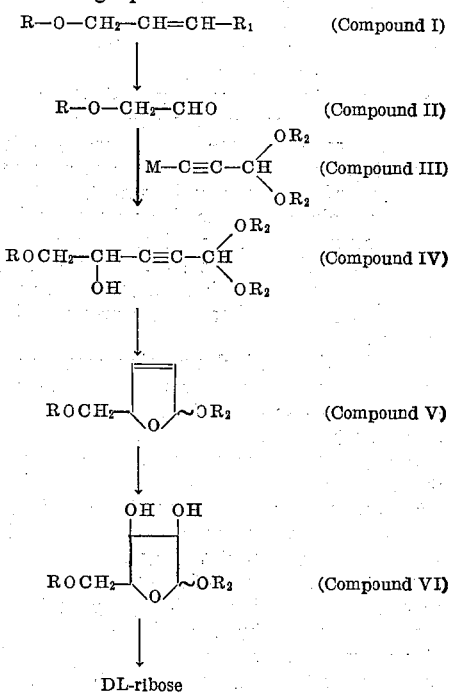

In the above formula, R, $R_1$, $R_2$ and M have the same meaning as above.

It is described in Beilstein 1, 817 that glycol aldehyde is prepared by subjecting allyl alcohol to ozone oxidation. We have found that the compound (II) can be obtained in very high yield by subjecting the compound (I) to ozone oxidation in the presence of formaldehyde in case where $R_1$ in the compound (I) is one of the above mentioned substituents other than hydrogen atom or in the absence of formaldehyde in case where $R_1$ in the compound (I) is hydrogen atom.

The first step in the process according to the present invention is preferably carried out by ozonizing the compound (I) in a suitable inert solvent such as methylene chloride, ethyl acetate, petroleum ether, chloroform, carbon tetrachloride and the like at a lower temperature, for example, about 0° C. to about —70° C. and reducing the ozonized product by means of an ozonide decomposing agent, for example, acetic acid and zinc or catalytic reduction to give the compound (II).

After completion of the reaction, the reaction product, the compound (II), may be isolated from the reaction mixture by one of the conventional methods. For example, after completion of the reaction the solid substance is filtered and washed with an organic solvent. The combined organic solvent solutions are washed successively with sodium bicarbonate solution and water, and then dried over anhydrous sodium sulfate. The solvent is distilled off from the dried solution and the residue is distilled under reduced pressure to give the desired compound (II).

The second step in the process according to the present invention, which involves conversion of the compound (II) to the compound (IV), is preferably performed by reacting the compound (II) with the compounds (III) in a suitable inert solvent. Examples of the organic solvents include liquid ammonia, lower alkyl ethers containing from 1 to 5 carbon atoms on the alkyl moiety, for example, diethyl ether, alicyclic ethers, for example, tetrahydrofuran, aromatic hydrocarbons, for example, benzene and the like. Liquid ammonia, diethyl ether and tetrahydrofuran are the suitable inert solvents. The reaction temperature is between about —60° C. and about 100° C., and very preferably it is about room temperature.

After completion of the reaction, the reaction product may be isolated from the reaction mixture by one of the conventional methods. For example, the solvent is removed from the reaction mixture and the residue is subjected to distillation or recrystallization from ethanol or diethyl ether to obtain the desired compound (IV).

Partial hydrogenation, which is the third step in the process according to the present invention, is conveniently carried out by hydrogenating the compound (IV) in the presence of a rare metal catalyst such as palladium, platinum, nickel and the like with or without a suitable inert solvent. When an inert solvent is to be used, examples of the suitable inert solvents are ethyl acetate, chloroform, lower alcohols containing from 1 to 5 carbon atoms, petroleum ether, glacial acetic acid, pyridine and the like.

The fourth step, hydroxylation, may be advantageously carried out by hydroxylating the compound (V) obtained in the above described third step by means of an oxidizing agent such as permanganate, for example, potassium permanganate, hydrogen peroxide, osmium tetraoxide and the like in a suitable inert solvent such as water, aqueous alcohols, lower alcohols containing from 1 to 5 carbon atoms, aqueous acetone, acetone and the like. The reaction is carried out at a lower temperature, for example, about 0° C. to about —30° C. After completion of the reaction, the reaction product may be isolated from the reaction mixture by one of the conventional methods. For example, after completion of the reaction, the solid material is filtered and washed with ether, then the filtrate is also extracted with same solvent and the combined organic solution is dried and evaporated off to obtain the residue which gives the desired compound (VI) by distillation under reduced pressure.

The final step, mineral acid treatment, may be carried out by treating the compound (VI) with a diluted mineral acid such as diluted hydrochloric acid, sulfuric acid and the like. After completion of the reaction, the reaction product, which is DL-ribose, may be isolated from the reaction mixture by one of the conventional methods. For example, the reaction mixture is treated with a suitable ion exchange resin to remove mineral acid used and the effluent is concentrated under reduced pressure to obtain residue containing DL-ribose in crude state. Pure DL-ribose is obtained by acylating the crude DL-ribose with an acylating agent, for example, propionic anhydride and distillating the resulting DL-ribose tetraacylate.

The allyl alcohol derivatives having the Formula I used as the starting material is prepared as follows: the allyl alcohol derivatives having the Formula I in which $R_1$ represents hydrogen atom are prepared by reacting allyl alcohol with dihydropyran or dihydrofuran in the presence of a trace of mineral acid. The allyl alcohol derivatives having (I) in which $R_1$ represents one of the above mentioned substituents other than hydrogen atom are prepared by reacting butynediol with dihydropyran and/or dihydrofuran in the presence of a trace of mineral acid and partially hydrogenating the resulting compound.

The following examples are given for the purpose of illustration and not by way of limitation.

*Example 1.—Preparation of 2-(2'-tetrahydropyranyloxy)-ethanal*

Formaldehyde evolved by heating of 75 g. of paraformaldehyde is introduced into 1.3 l. of methylene chloride under ice cooling. After addition of 128 g. of 1,4-di(2'-tetrahydropyranyloxy)-butene to the resulting solution, a theoretical amount of ozone is passed through the solution at —50° C. (ozone concentration: 6.098 g./hr.). After completion of the ozonization, the reaction mixture is transferred in a three-necked round-bottomed flask, to which 130 g. of zinc is added. A mixture of 75 ml. of acetic acid and 3.8 ml. of water is added to the resulting mixture under ice cooling at such a rate as to maintain the temperature of the content at about 16 to 19° C. After completion of the addition, the content of the flask is stirred at room temperature for an additional 30 minutes. At the end of the stirring the resulting mixture gives negative ozonide reaction on starch iodide paper. The solid substance is filtered and washed thoroughly with methylene chloride. Combined organic solutions are washed successively with sodium bicarbonate solution and water, and then dried over anhydrous sodium sulfate. The methylene chloride is distilled off from the dried solution and the residue is distilled to give 9.5 g. (63.5% of the theoretical amount) of 2-(2'-tetrahydropyranyloxy)-ethanal boiling at 77–79° C. at 10 mm. Hg.

*Analysis.*—Calc'd for $C_7H_{12}O_3$: C, 58.25; H, 8.49. Found: C, 58.31; H, 8.39.

*Example 2.—Preparation of 2-(2'-tetrahydropyranyloxy)-ethanal from 3-(2'-tetrahydropyranyloxy)-propene-1*

A theoretical amount of ozone is passed through a solution of 14.2 g. of 3-(2'-tetrahydropyranyloxy)-propene-1 in 100 ml. of methylene chloride at —50° C. After completion of the ozonization, the reaction mixture is transferred in a three-necked, round-bottomed flask and 26 g. of zinc is added to the solution to which a mixture of 15 ml. of acetic acid and 0.7 ml. of water is added under ice cooling at such a rate as to maintain the solution at 15 to 19° C. After completion of the addition, the solution is stirred at room temperature for an additional 30 minutes. At the end of the stirring, the solution gives negative on starch iodide paper. The solution is treated by the same method as described in Example 1 to give 10.5 g. (73% of the theoretical amount) of 2-(2'-tetrahydropyranyloxy)ethanal boiling at 77 to 79° C. at 10 mm. Hg.

*Analysis.*—Calc'd for $C_7H_{12}O_3$: C, 58.39; H, 8.21. Found: C, 58.31; H, 8.39.

*Example 3*

A solution of 11.8 g. of ethyl bromide in 30 ml. of tetrahydrofuran is added slowly dropwise to a mixture of 2.62 g. of metallic magnesium in 50 ml. of tetrahydrofuran with vigorous stirring. After resolution of all of the added magnesium, the solution is stirred for an additional 30 minutes. To the solution is added dropwise a solution of 12.8 g. of propargyldiethylacetal in 30 ml. of tetrahydrofuran over about 15 minutes during which period ethane gas is evolved vigorously. After completion of the addition, the reaction mixture is stirred at room temperature for an additional hour. A solution of 12 g. of 2-(2′-tetrahydropyranyloxy)-ethanol 30 ml. of tetrahydrofuran is added dropwise to the resulting mixture while maintaining the temperature of the mixture below 35° C. The mixture is stirred for an additional 2 hours and then allowed to stand for 24 hours. The resulting reaction mixture is poured into saturated aqueous ammonium chloride solution and the organic layer is separated and dried over anhydrous sodium sulfate. The solvent is distilled off from the dried solution and the residue is distilled under reduced pressure to obtain a fraction boiling at 141 to 142° C. at 0.1 mm. Hg. There is obtained 14 g. of 1,1-diethoxy-5-(2′-tetrahydropyranyl) oxy-pent-2-yn-4-ol.

Analysis.—Calc'd for $C_{14}H_{24}O_5$: C, 61.74; H, 8.88. Found: C, 61.52; H, 8.88.

*Example 4.—Preparation of 2-ethoxy-5-(2′-tetrahydropyranyl) oxymethyl-2,5-dihydrofuran*

49.5 g. of Lindlar's catalyst (palladium on calcium carbonate) is added to a solution of 148 g. of 1,1-diethoxy-5-(2′-tetrahydropyranyl) oxy-pent-2-yn-4-ol in 950 ml. of ethyl acetate and the mixture is shaken under hydrogen atmosphere until 93% of a theoretical amount of hydrogen is absorbed. After completion of the reaction, the reaction mixture is filtered to remove catalyst, which is washed with a small amount of diethyl ether. The combined filtrate and washings are distilled to remove the solvent and the residue is distilled under reduced pressure to give 78 g. of 2-ethoxy-5-(2′-tetrahydropyranyl) oxymethyl-2,5-dihydrofuran boiling at 80 to 90° C. at 0.15 mm. Hg.

Analysis.—Calc'd for $C_{12}H_{20}O_4$: C, 63.20; H, 8.73. Found: C, 63.21; H, 8.62.

*Example 5.—Preparation of 2-ethoxy-3,4-dihydroxy-5-(2′-tetrahydropyranyl) oxymethyl-tetrahydrofuran*

12.5 g. of 2-ethoxy-5-(2′-tetrahydropyranyl) oxymethyl-2,5-dihydrofuran obtained by the method described in Example 4 is added to a mixture of 65 ml. of acetone and 42 ml. of water and 7.0 g. of crystal of potassium permanganate is added portionwise to the solution at —15 to 20° C. in 2 hours under stirring. After completion of the addition, the mixture is stirred for an additional 30 minutes. After completion of the reaction, the reaction mixture is centrifuged to remove colloidal manganese dioxide, which is washed with a small amount of diethyl ether. On the other hand, the mother liquor is concentrated under reduced pressure and the residual aqueous solution is extracted with diethyl ether. The extract is combined with the above washings and the combined solutions are dried. Removal of the solvent from the solution and distillation of the residue under reduced pressure give 7.6 g. of a viscous oil boiling 150 to 160° C. (bath temperature) at $5 \times 10^{-4}$ mm. Hg.

Analysis.—Calc'd for $C_{12}H_{22}O_6$: C, 54.95; H, 8.45. Found: C, 54.96; H, 8.01.

*Example 6.—Preparation of DL-ribose*

A suspension of 7.5 g. of 2-ethoxy-3,4-dihydroxy-5-(2′-tetrahydropyranyl) oxymethyl - tetrahydrofuran in 50 ml. of 5% hydrochloric acid is allowed to stand for 3 days at room temperature. The reaction mixture is subjected to deacid-treatment with Amberlite IR–4B for de-acidification and the effluent is concentrated under reduced pressure at room temperature. The residue is dissolved in anhydrous ethanol and to the resulting solution is added benzene sufficient to separate oily substances, which are recovered by decantation and dried under reduced pressure at room temperature to yield 3.5 g. of syrup. The syrup is subjected to ion exchange-chromatrography with Dowex-1 in the form of borate and elution is carried out by using 0.025 M potassium borate ($K_2B_4O_7$) solution to yield 2.8 g. of pure DL-ribose as a syrupy substance, which has the following physical properties:

$Rf$ value: 0.32 (Control: D-ribose; $Rf$ value 0.32; solvent, n-butanol:water:acetic acid (4:5:1); temperature $20 \pm 1°$ C.; time 15.5 hours).

DL-ribose tetrapropionate: B.P. 155~165° C. (bath temperature) at $3 \times 10^{-4}$ mm. Hg.

Analysis.—Calc'd for $C_{17}H_{26}O_9$: C, 54.60; H, 6.95. Found: C, 54.71; H, 7.03.

1-O - acetyl - 2,3,5-tri - O-benzoyl-β-DL-ribofuranose: M.P. 115~117° C.

Analysis.—Calc'd for $C_{28}H_{24}O_9$: C, 66.66; H, 4.80. Found: C, 66.15; H, 4.70.

DL-ribose phenylosazone: M.P. 166~168° C.

Analysis.—Calc'd for $C_{17}H_{20}O_3N_4$: C, 62.18; H, 6.14; N, 17.06. Found: C, 61.31; N, 16.91.

While specific embodiments of the invention have been shown and described in detail to illustrate the application of the inventive principles, it will be understood that this invention may be embodied otherwise without departing from such principles.

What is claimed is:

1. Process for preparing DL-ribose which comprises subjecting a compound having the formula $$R-O-CH_2-CH=CH-R_1$$

wherein R is a member selected from the group consisting of 2-tetrahydropyranyl and 2-tetrahydrofuryl groups and $R_1$ is a member selected from the group consisting of hydrogen atom, a lower alkyl group containing from 1 to 3 carbon atoms

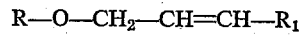

to ozone oxidation to form a compound having the formula $$R-O-CH_2-CHO$$

wherein R has the same meaning as above, reacting the latter compound with a compound having the formula

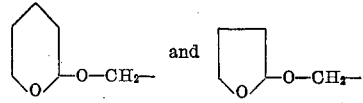

wherein X is a member selected from the group consisting of chlorine, bromine and iodine atoms and $R_2$ is a lower alkyl group containing from 1 to 3 carbon atoms to form a compound having the formula

wherein R and $R_2$ have the same meaning as above, subjecting the latter compound to partial hydrogenation in the presence of a rare metal catalyst to form a compound having the formula

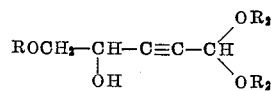

wherein R and $R_2$ have the same meaning as above, reacting the latter compound with an oxidizing agent selected from the group consisting of alkali metal permanganate, hydrogen peroxide and osmium tetraoxide to form a compound having the formula

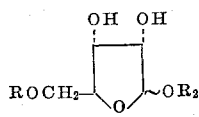

wherein R and R$_2$ have the same meaning as above and treating the latter compound with a dilute mineral acid.

2. A process for preparing a compound having the formula

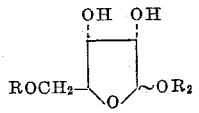

wherein R is a member selected from the group consisting of 2-tetrahydropyranyl and 2-tetrahydrofuryl group and R$_2$ is a lower alkyl group containing from 1 to 3 carbon atoms which comprises subjecting a compound having the formula $$R-O-CH_2-CH=CH-R_1$$

wherein R has the same meaning as above and R$_1$ is a member selected from the group consisting of hydrogen atoms, a lower alkyl group containing from 1 to 3 carbon atoms,

to ozone oxidation to form a compound having the formula $$R-O-CH_2-CHO$$

wherein R has the same meaning as above, reacting the latter compound with a compound having the formula

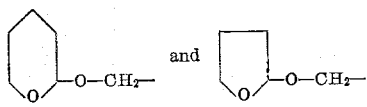

wherein X is a member selected from the group consisting of chlorine, bromine and iodine atoms and R$_2$ has the same meaning as above to form a compound having the formula

wherein R and R$_2$ have the same meaning as above, subjecting the latter compound to partial hydrogenation in the presence of a rare metal catalyst to form a compound having the formula

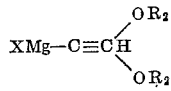

wherein R and R$_2$ have the same meaning as above, reacting the latter compound with an oxidizing agent selected from the group consisting of alkali metal permanganate, hydrogen peroxide and osmium tetraoxide.

3. A process for preparing a compound having the formula

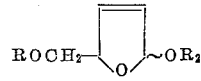

wherein R is a member selected from the group consisting of 2-tetrahydropyranyl and 2-tetrahydrofuryl groups and R$_2$ is a lower alkyl group containing from 1 to 3 carbon atoms which comprises subjecting a compound having the formula $$R-O-CH_2-CH=CH-R_1$$

wherein R has the same meaning as above and R$_1$ is a member selected from the group consisting of hydrogen atom, a lower alkyl group containing from 1 to 3 carbon atoms

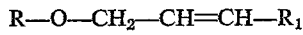

to ozone oxidation to form a compound having the formula $$R-O-CH_2-CHO$$

wherein R has the same meaning as above, reacting the latter compound with a compound having the formula

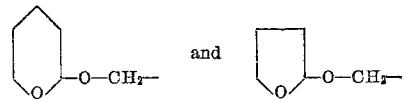

wherein X is a member selected from the group consisting of chlorine, bromine and iodine atoms and R$_2$ has the same meaning as above to form a compound having the formula

wherein R and R$_2$ have the same meaning as above, subjecting the latter compound to partial hydrogenation in the presence of a rare metal catalyst.

4. 2 - ethoxy-3,4 - dihydroxy-5-(2'-tetrahydropyranyl) oxymethyl-tetrahydrofuran.

5. 2 - ethoxy-5-(2'-tetrahydropyranyl)oxymethyl-2,5-dihydrofuran.

6. 1,1-diethoxy - 5 - (2'-tetrahydropyranyl)oxy-pent-2-yn-4-ol.

No references cited.

LEWIS GOTTS, *Primary Examiner.*

J. R. BROWN, *Assistant Examiner.*